June 23, 1925.
F. P. YEOMANS
CONTROLLER HANDLE
Filed May 4, 1922
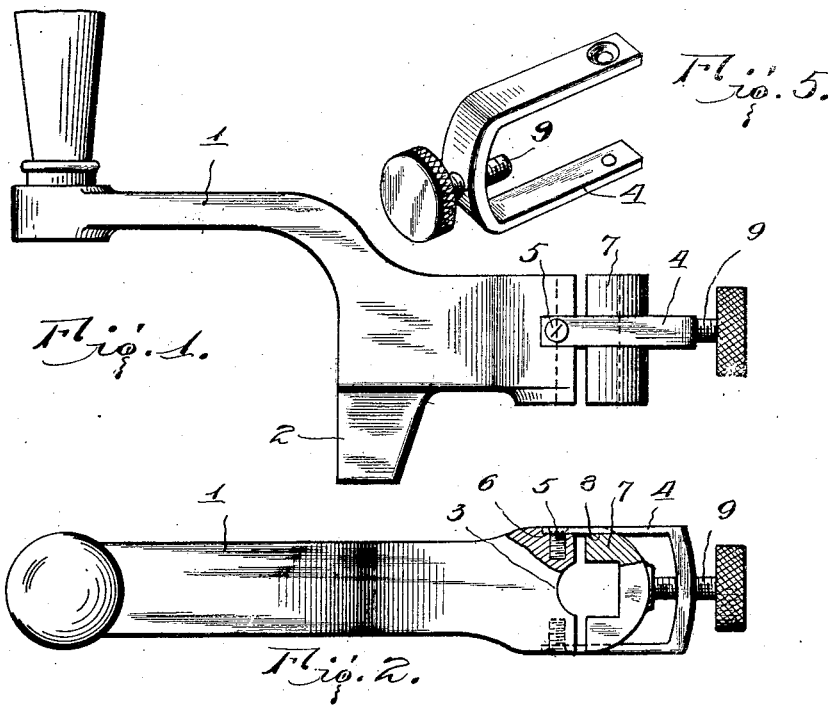
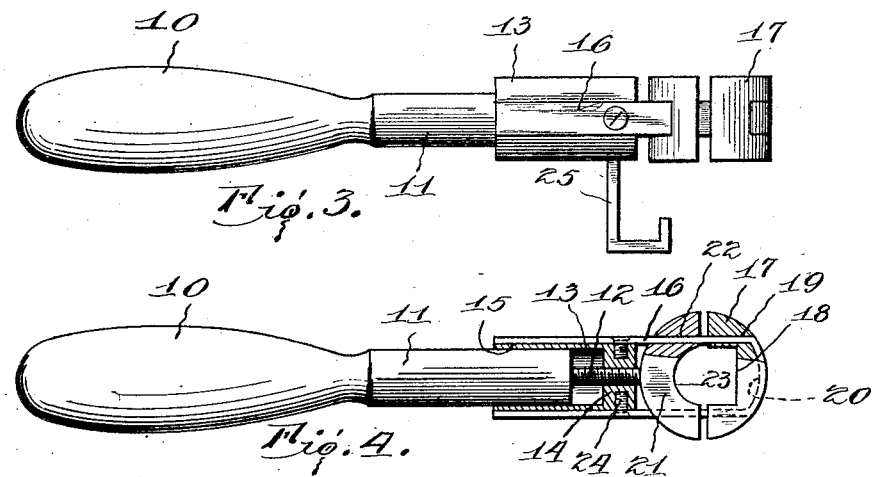
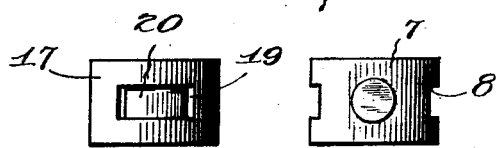
Inventor,
Frank P. Yeomans.
By Donald L. Maxson.
Attorney.

Patented June 23, 1925.

1,543,145

UNITED STATES PATENT OFFICE.

FRANK P. YEOMANS, OF OAKLAND, CALIFORNIA, ASSIGNOR, BY DIRECT AND MESNE ASSIGNMENTS, OF ONE-HALF TO SELMA YEOMANS, OF OAKLAND, CALIFORNIA, AND ONE-HALF TO MAX HORN, OF SAN FRANCISCO, CALIFORNIA.

CONTROLLER HANDLE.

Application filed May 4, 1922. Serial No. 558,384.

*To all whom it may concern:*

Be it known that I, FRANK P. YEOMANS, a citizen of the United States, residing at Oakland, in the county of Alameda and State of California, have invented certain new and useful Improvements in Controller Handles, of which the following is a specification.

This invention relates to improvements in controller and air brake handles, and more particularly to means for connecting said handles in operative position.

An object of the invention is to provide a controller or air brake handle for cars, which will embody a manually operated locking means.

Another object of the invention is to provide a controller or air brake handle with suitable locking means which may be interchangeable when worn and adjustable to take up wear of the parts.

A further object of the invention is to provide a suitable controller or air brake handle, which will combine positive locking means for said handle and rigidity of the several parts.

A still further object of the invention is to provide a suitable controller or air brake handle, which will be highly efficient in use and inexpensive to manufacture.

Other objects will appear as the description proceeds.

In the accompanying drawings which constitute a part of my application,

Figure 1 is a side elevation of my improved device attached to a controller handle;

Figure 2 is a plan view of the same;

Figure 3 is a side elevation of my improved locking device shown attached to an air brake handle;

Figure 4 is a plan view of the air brake handle with my improved locking mechanism in operative position thereon;

Figure 5 is a perspective view of the clip or yoke with locking screw, as used on the controller handle;

Figure 6 is a front elevation of the stationary jaw as used in connection with the air brake handle, and Figure 7 is a front elevation of the movable jaw as used in connection with the controller handle.

Like characters of reference are used throughout the several views and the specification to designate corresponding parts.

The controller handle 1 is provided with the customary stop lug 2, and with a hollowed out or indented rigid inner jaw 3, which is formed integral therewith. A yoke 4 is detachably secured to the controller handle or arm 1, by means of the screws 5. It will be noted that this yoke 4 seats or is housed within the oppositely disposed grooves 6 in the said arm 1, and is flush therewith. An interchangeable and slidable jaw member 7 is provided with the square seat or jaw portion, and with the oppositely disposed grooves 8, which are adapted to receive the opposite sides of the yoke 4, so that said jaw 7 will freely slide back and forth upon the arms of said yoke. A locking screw 9 is carried by the yoke 4, and is adapted to engage the outer curved surface of the jaw member 7, so that when the screw is tightened, the jaw member will be forced towards the rigid or stationary jaw member to clamp and securely hold the controller arm upon the controller stem (not shown).

The air brake handle 10 is formed with a round shank 11, with an elongated screw-threaded stud 12. A hollow body member 13 is provided with the web portion 14, through which the threaded stud 12 is adapted to pass. Oppositely disposed longitudinal slots 15 are also cut in the member 13, to receive the side arms of the yoke 16, which is similar to the yoke 4, used in connection with the controller arm or handle. The fixed jaw member 17 is provided with the square socket or air stem engaging portion 18, and with the spaced slots 19 to receive the arms of the yoke 16. The member 17 is further provided with the notched out portion 20, which connects the slots 19, and which is adapted to receive the cross bar of the yoke 16, so that the said yoke will lie flush with the surface of the member 17. The inner or slidable jaw member 21 is provided with the spaced slots 22, through which the arms of the yoke 16 pass, and is further provided with the curved gripping portion 23 which is adapted to engage the air stem (not shown). From the foregoing description, it will be apparent that when the air brake handle is placed onto the air valve stem, that by tightening up on the handle 10, the movable jaw 21 will be forced towards the fixed jaw 17, thereby clamping and locking the operating handle in fixed position. It will also be obvious that should wear occur in the several parts, that the tightening down of the handle 10 would compensate for this wear.

Likewise in the controller handle, after it is placed upon the controller stem, it is only necessary to tighten the screw 9, thereby forcing the jaw members together upon said stem, until the said controller handle is securely locked in operative position.

The yoke 16 is held in place on the body portion 13, by means of the screws 24. The body portion 13 also carries a stop pin or arm 25, as is customary.

It will be understood that the several parts in the locking mechanism may readily be replaced when worn, but are so made that compensation may be made to take care of the wear so that the handles will last indefinitely.

Many minor changes in detail of construction may be resorted to without departure from the spirit of the invention.

Having thus described my invention what I claim as new and desire to secure by Letters Patent of the United States is:

1. A controller handle comprising a handle portion, a fixed jaw formed integrally therewith, a detachable yoke member carried by said handle portion, a slidable jaw carried by and embracing said yoke, and means for moving said slidable jaw towards said fixed jaw.

2. A controller handle comprising a handle portion, a fixed jaw formed integral therewith, a detachable yoke carried by said handle portion, an interchangeable slidable jaw carried by and embracing said yoke, and means for holding said slidable jaw in a number of adjusted positions.

3. A controller handle comprising a body portion, a handle portion rotatable in and carried by said body portion, a detachable yoke carried by said body portion, an interchangeable fixed jaw at the outer end of said yoke, an interchangeable slidable jaw operable on said yoke, and means for forcing said slidable jaw towards said fixed jaw.

4. A controller handle comprising a body portion, a handle portion, a yoke carried by said body portion, a fixed jaw, a slidable jaw, said jaws being provided with oppositely disposed slots to engage said yoke, and means for holding said handle portion in said body portion and for adjusting said slidable jaw towards said fixed jaw.

In testimony whereof I affix my signature.

FRANK P. YEOMANS.